July 9, 1940. R. B. COTTRELL 2,207,287
DRAFT GEAR
Filed Nov. 5, 1937 7 Sheets-Sheet 1
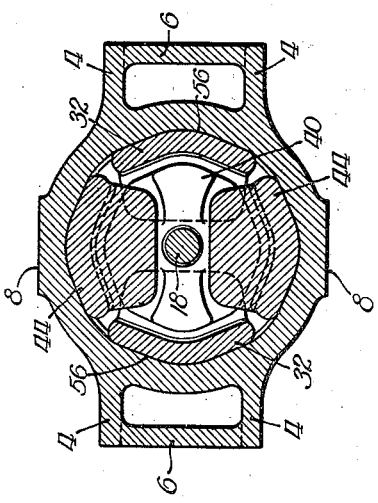
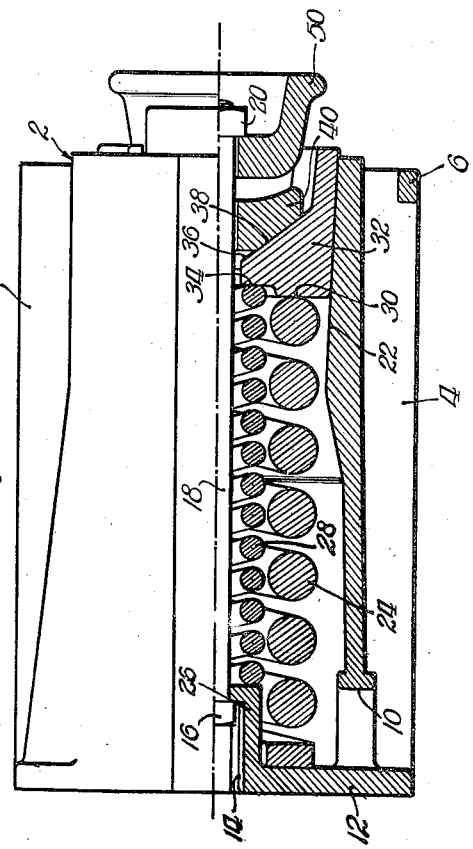
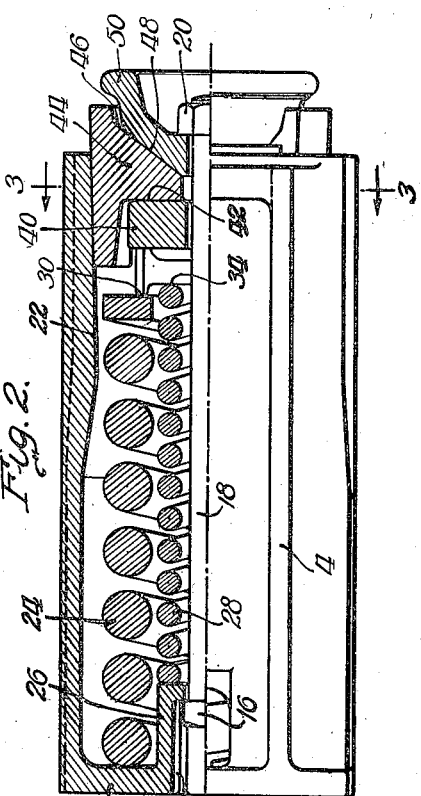
Inventor:
Robert B. Cottrell
By: Orrin O. B. Garner
Atty.

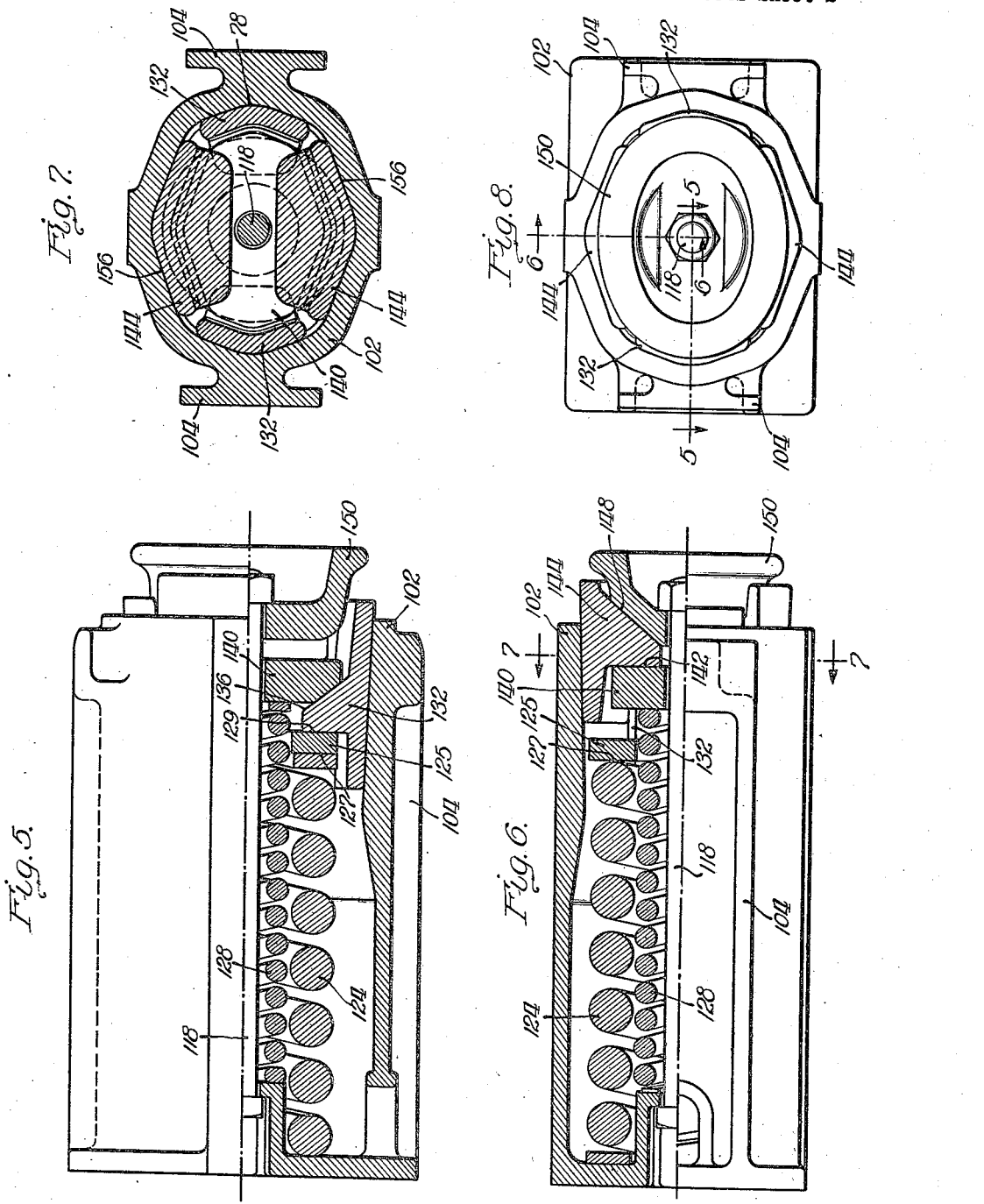

July 9, 1940.  R. B. COTTRELL  2,207,287
DRAFT GEAR
Filed Nov. 5, 1937  7 Sheets-Sheet 3

Inventor:
Robert B. Cottrell
By: Orrin O. B. Garner
Atty.

July 9, 1940. R. B. COTTRELL 2,207,287
DRAFT GEAR
Filed Nov. 5, 1937 7 Sheets-Sheet 4
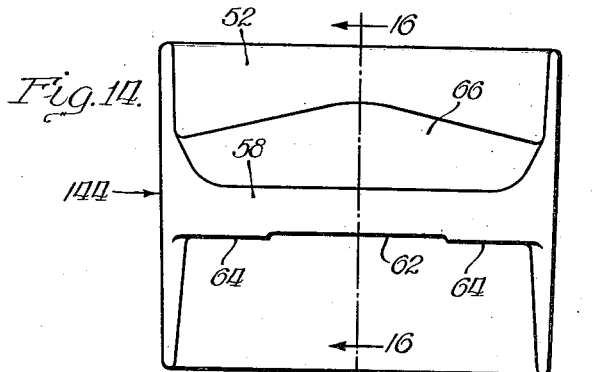
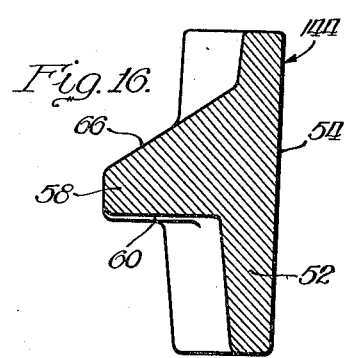
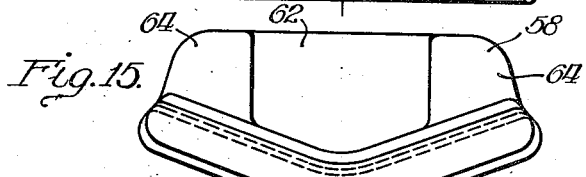
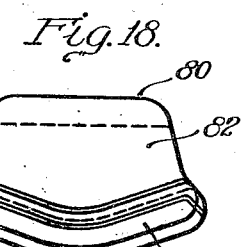
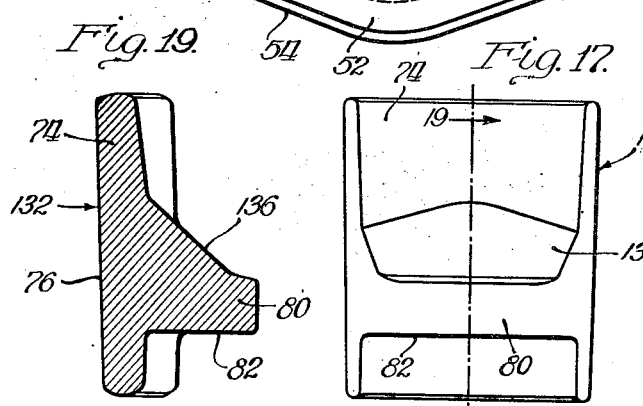
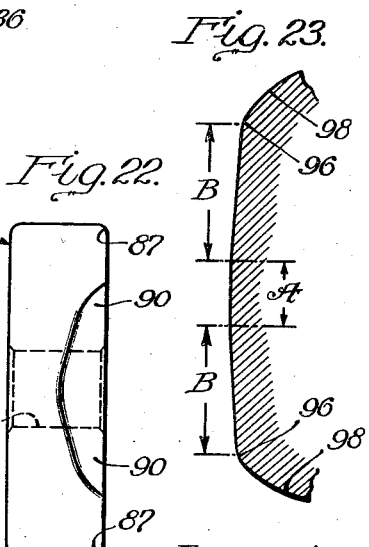
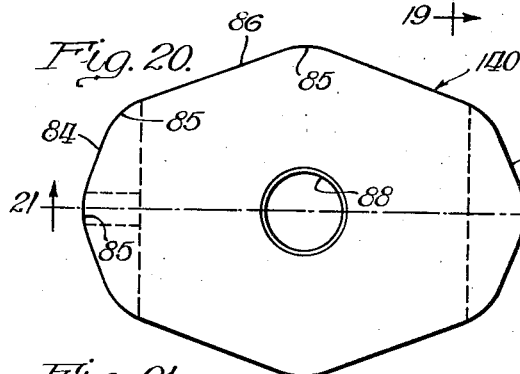
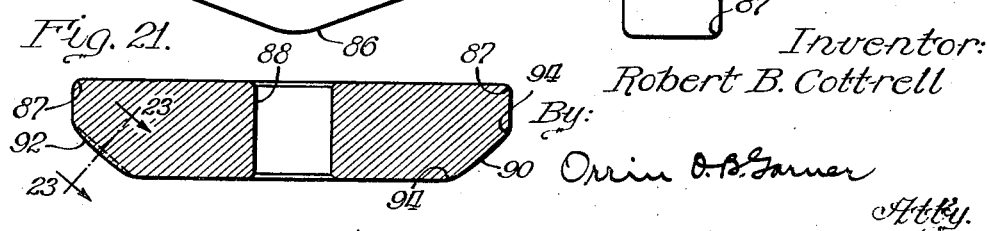
Inventor:
Robert B. Cottrell
By:
Orrin O. B. Garner
Atty.

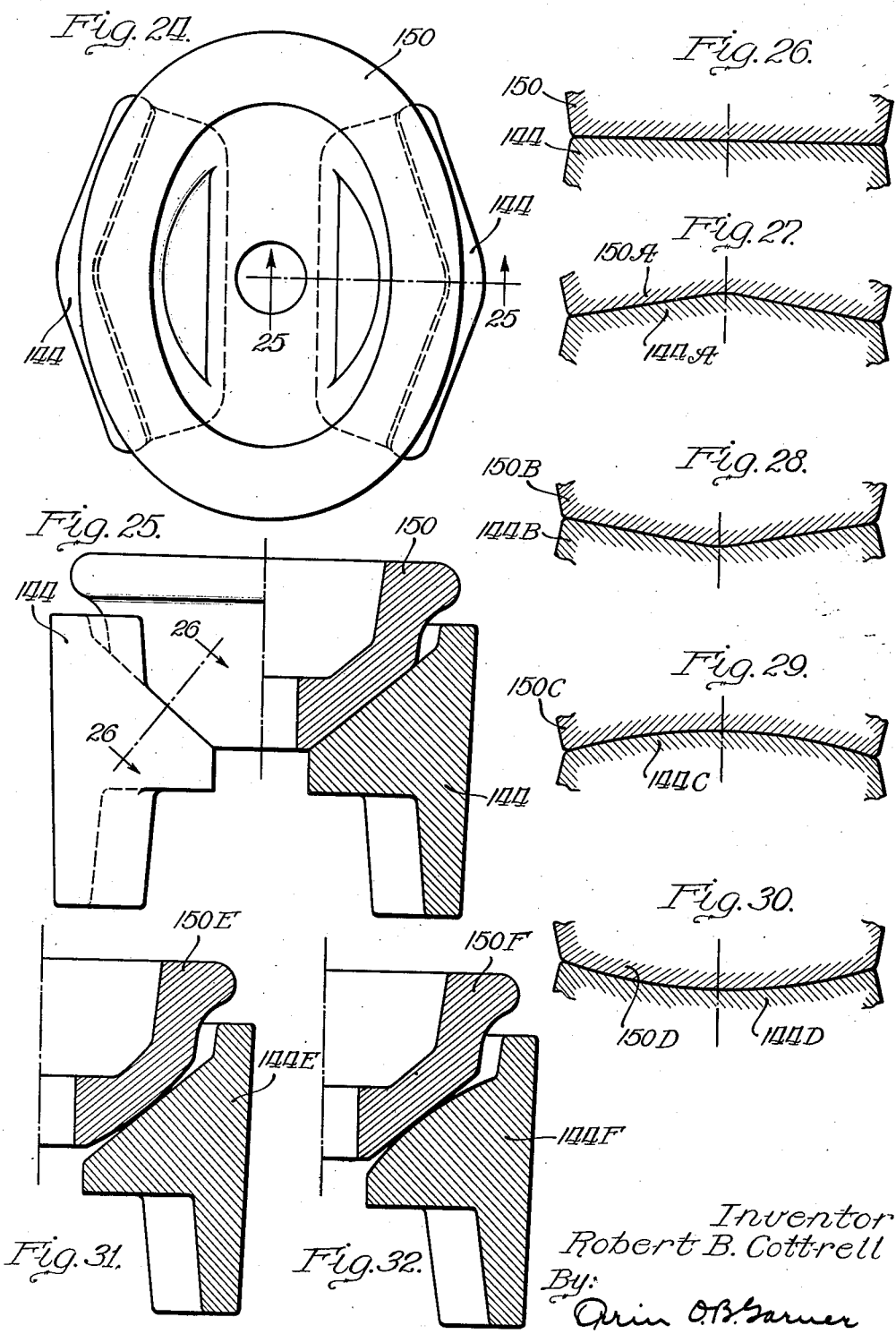

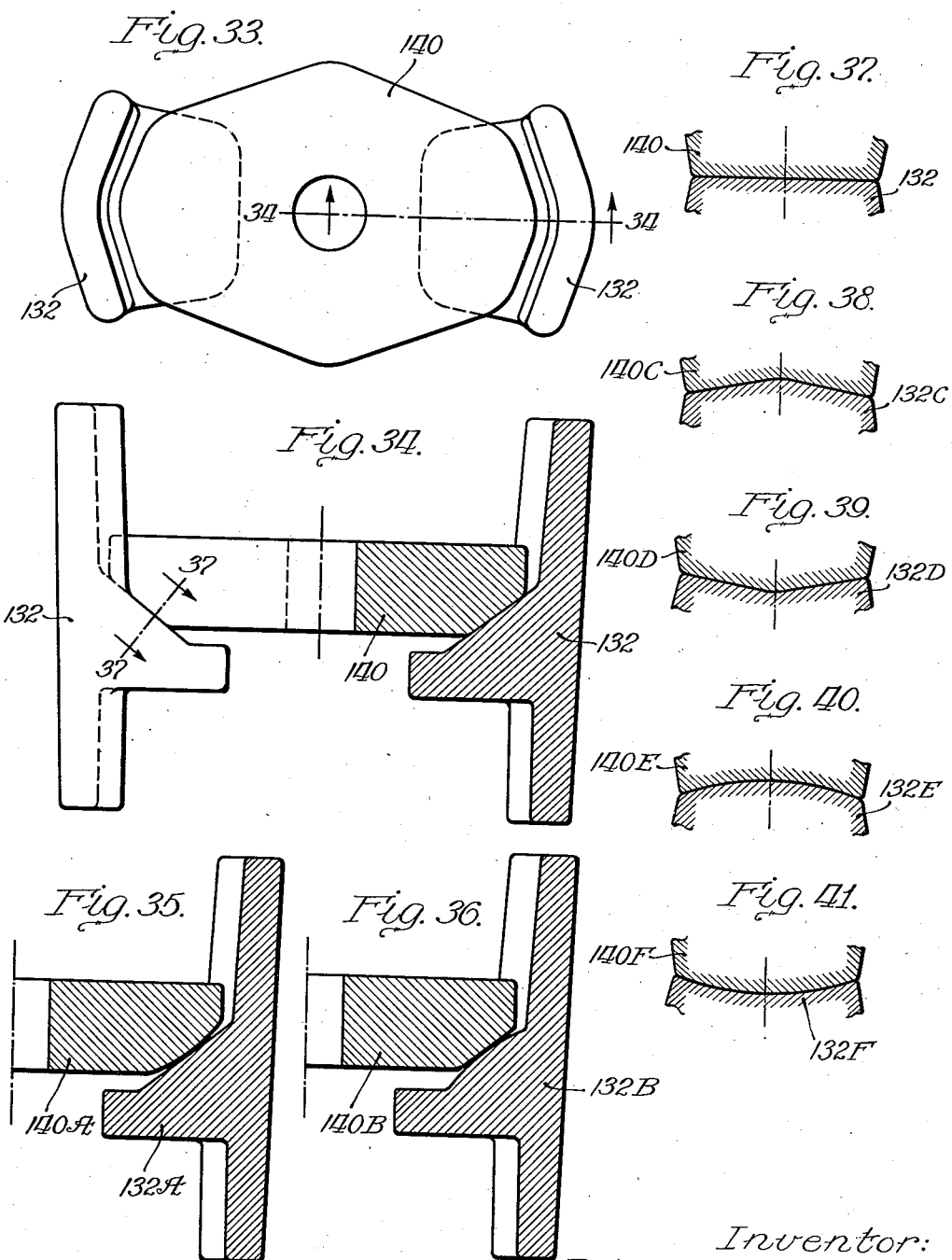

July 9, 1940.    R. B. COTTRELL    2,207,287
DRAFT GEAR
Filed Nov. 5, 1937    7 Sheets-Sheet 7

Inventor:
Robert B Cottrell
By Orrin O. Garner
Atty

Patented July 9, 1940

2,207,287

UNITED STATES PATENT OFFICE 2,207,287

DRAFT GEAR

Robert B. Cottrell, Chicago, Ill., assignor to American Steel Foundries, Chicago, Ill., a corporation of New Jersey Application November 5, 1937, Serial No. 172,925

27 Claims. (Cl. 213—32)

My invention relates to railway draft gears and more particularly to a form of draft gear generally described as barrel type wherein the gear parts are enclosed within a housing.

The most simple form of shock absorbing mechanism consists of some form of resilient element—usually a spring. Such a device is capable of absorbing a force only equal to its own capacity. Figure 42 illustrates diagrammatically a simple form of shock or force absorbing device consisting of a spring A having a capacity of P. This device will absorb or resist a force of W pounds which is equal to the capacity P.

If a casing or housing B together with friction shoes C and wedge D are introduced as shown diagrammatically in Figure 43, then although the same spring is used as in Figure 42, a larger force W is required to close the apparatus due to the friction of the shoes on the housing. W in this case is equal to the spring capacity P times a constant C or: W equals PC.

Such a mechanism enables the device to absorb a greater force than the capacity of the spring. The multiplying factor C depends upon the various angles of the friction surfaces of wedge and shoes and it is, of course, desirable to obtain as high a multiplying factor as practicable. However, due to space limitations and danger of the gear sticking and not opening or releasing freely, there is a limit to the amount of multiplication that can be obtained. Gears of this type require a spring of large capacity in order to obtain sufficient gear capacity with freedom from sticking. Such springs are necessarily highly stressed, heavy and expensive.

In my proposed form of gear the multiplication of the spring capacity is carried further by the introduction of a second set of shoes in series with the first. The second set of shoes has the usual multiplication factor but it multiplies the resistance of the first set of shoes instead of the spring capacity P. The factor is applied to the result obtained by the combination of the first set of shoes, wedge and spring. We have then $W_1$ equals $(PC)d$ wherein "$d$" is the multiplication factor for the second set of shoes and wedge shown in Figure 44 as E and F respectively. In Figure 44 are shown all the parts represented in Figure 43 and in addition the second set of shoes E and wedge F. Inasmuch as this second set, E, F, is arranged in series with the first set C, D, it is readily apparent how the additional multiplication is obtained. Such gears wherein the lateral pressure passes through two or more sets of shoes in series are sometimes designated multiple action clutch gears. With this type of gear a certain capacity can be obtained with less lateral pressure against the housing and therefore with the use of lighter weight parts.

By this means considerably more shock absorption for a given spring capacity can be obtained or an equivalent amount of shock absorption can be obtained with a lesser spring capacity. Moreover, the angles for the respective sets of shoes and wedges may be modified as desired in order to eliminate any danger of sticking and at the same time maintain the required capacity. It will be apparent that with such a series arrangement a greater capacity may be achieved within smaller space limitations than would otherwise be possible. It will also be apparent that a mechanism such as I have hereinabove set forth diagrammatically may consist of any practical number of sets of shoes and wedges in series and each set may be composed of one or more shoes.

In one modification of such a gear as I have above described I propose to use two sets of two shoes each, arranged in what is known as a barrell type housing. The outer and inner sets are placed at right angles or at 90° to each other and each shoe is between two shoes of the other set. By using two shoes in each set the shoe pressures are equalized as they are equidistant from the load center. In such an arrangement the shoes are also "cross-equalized" inasmuch as the sets are arranged at 90° to each other and a diagram for such an arrangement is shown in Figure 45.

In a draft gear constructed according to the arrangement shown diagrammatically in Figures 44 and 45 as above described, it will be apparent to those skilled in the art that, other things being equal, the outer shoes will have the greater pressure against the housing. For reasons well known in the art, however, it is desirable to equalize the unit pressure on the two sets of shoes and this may be accomplished conveniently in either of two ways; namely, by the provision of a more blunt or less acute angle of engagement between the wedge F and the shoes E as measured from the axis of the gear, Figure 44, than is provided between the shoes C and the wedge D, or I may make the outer shoes E with larger bearing area against the housing B than is provided for the shoes C against the said housing in which case a similar result may be obtained.

I have termed my novel draft gear a "series"

gear because the resilient force passes successively through each set of shoes; and I have described it as "cross-equalized" inasmuch as in this modification it consists essentially of a load bearing member supported at two points equidistant from the load center as shown diagrammatically in Figure 45 and consequently the load must be equally divided. The term "cross" signifies that one set of shoes is angularly spaced from the other set of shoes and, as shown in said diagram, the spacing angles are each 90°. In such a structure it will be apparent to one skilled in the art that each set of shoes may be considered as a function of the resultant obtained from the preceding set of shoes.

It is the primary object of my invention to devise a draft gear incorporating the novel features above described.

A further object is to devise such a gear having a maximum shock absorbing capacity with a minimum spring capacity and having a plurality of sets of shoes so arranged that the resilient force passes successively therethrough.

Another object of my invention is to provide a draft gear wherein a plurality of sets of friction shoes will be arranged in series as above described whereby the frictional resistance of the several sets of shoes are used successively, the resistance offered by one set of shoes thus acting as a multiplying factor of the resistance offered by the preceding set of shoes, etc. By this means I may obtain a much larger spring capacity multiplying factor than has heretofore been found possible.

A more specific object of my invention is to design a draft gear having four shoes comprising two sets of two shoes each with the said sets cross-equalized with respect to each other and in series with each other, one set of which shall function as a unit on opposed internal faces of a housing and another set of which shall function as a similar unit on other opposed internal faces of said housing and wherein the last-mentioned internal faces shall be alternately arranged with respect to the first-mentioned internal faces.

My invention further contemplates a cross-equalized series type draft gear comprising two sets of shoes as above described wherein one set of shoes has different wedge angles and larger frictional contact surfaces with the housing than another set of shoes.

A further more specific object of my invention is to design a four-shoe cross-equalized series type of draft gear as above described wherein each friction shoe will be seated in a V-shaped internal friction face of the housing and wherein the friction faces for one set of shoes will be alternately arranged with respect to the friction faces for the other set of shoes.

A yet further object of my invention is to devise a barrel type draft gear which will be singularly free from sticking, in other words, a gear in which the releasing action will be free and smooth, thus avoiding the delivery of shocks otherwise inevitable.

Another object of my invention is to devise a novel form of draft gear wherein the developed capacity curve under the standard tests required by the A. A. R. will be a smooth, straight curve following closely the ideal for a friction mechanism.

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1 is a top plan view of one modification of a draft gear embodying my invention, one-half of the view being in section and the section being taken substantially in the plane indicated by the line 1—1 of Figure 4.

Figure 2 is a side elevation of the draft gear structure shown in Figure 1, also partly in section, the section being taken substantially in the plane indicated by the line 2—2 of Figure 4.

Figure 3 is a transverse section through the gear shown in Figures 1 and 2, the section being taken through the friction end of the gear and substantially in the plane indicated by the line 3—3 of Figure 2.

Figure 4 is an end or front elevation of the gear shown in Figures 1 to 3.

Figure 5 is a top plan view of another modification of my invention, the view being partly in section and the section being taken substantially in the plane bisecting the gear longitudinally and as indicated by the line 5—5 of Figure 8.

Figure 6 is a side elevation of the gear shown in Figure 5, partly in section, the section being taken substantially in the plane bisecting the gear longitudinally as indicated by the line 6—6 of Figure 8.

Figure 7 is a transverse sectional view taken through the gear near the open or friction end of the housing and substantially in the plane indicated by the line 7—7 of Figure 6.

Figure 8 is an end elevation of the gear shown in Figures 5, 6 and 7.

Figure 11:
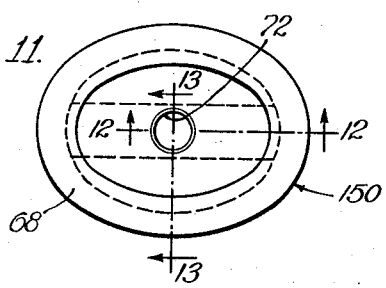
Figure 13:
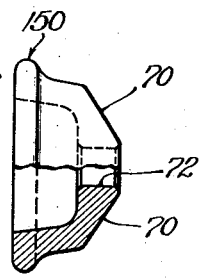
Figure 12:
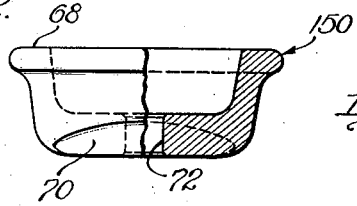
Figure 42:
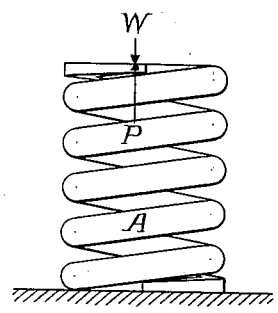
Figure 43:
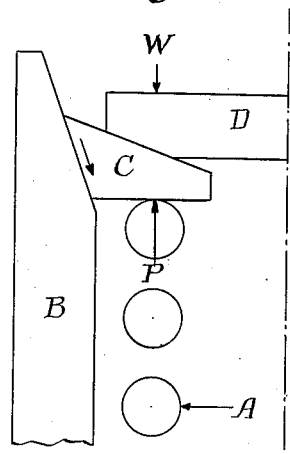
Figure 44:
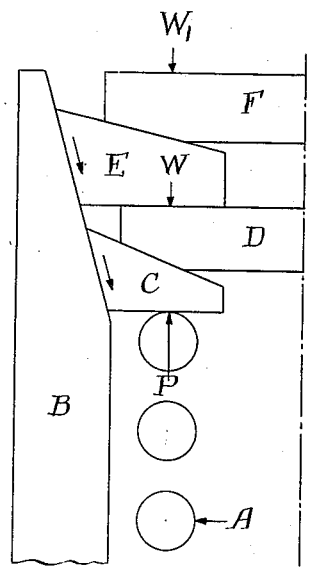
Figure 45:
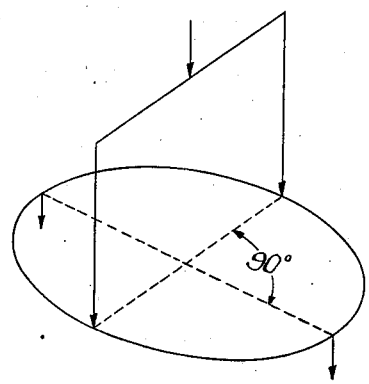

Figures 11, 12 and 13 show the form of follower wedge associated with a preferred embodiment of my invention as shown in Figures 5 to 8, Figure 11 being a top plan view thereof, Figure 12 a side elevation, half in section, the section being taken substantially in the plane indicated by the line 12—12 of Figure 11, and Figure 13 being an end elevation partly in section, the section being taken substantially in the plane indicated by the line 13—13 of Figure 11.

Figures 14, 15 and 16 show the form of outer friction shoe used in the modification of my invention shown in Figure 5 and wherein Figure 14 is a view in elevation of the inner face; Figure 15 is a bottom plan view; and Figure 16 is a sectional view substantially in the plane bisecting the shoe as indicated by the line 16—16 of Figure 14.

Figures 17, 18 and 19 show the form of inner friction shoe associated with the modification of my invention shown in Figure 5, Figure 17 being an elevational view of the inner face, Figure 18 a bottom plan view, and Figure 19 a section substantially bisecting the shoe longitudinally and in the plane as indicated by the line 19—19 of Figure 17.

Figures 20, 21, 22 and 23 are views of a preferred form of wedge block which may be associated with the modification of draft gear shown in Figure 5 and wherein Figure 20 is a top plan view; Figure 21 is a sectional view in a plane bisecting the wedge block longitudinally and substantially as indicated by the line 21—21 of Figure 20; Figure 22 is an end elevation; and Figure 23 is an enlarged transverse sectional view through the shoe engaging surface at one end of the wedge block, the section being taken substantially in the plane indicated by the line 23—23 of Figure 21.

Figures 24 to 32 are views of various modifications of the follower wedge and outer friction shoe assembly wherein Figure 24 is a plan view and Figure 25 is an elevational view partly in section, the section being taken substantially in the plane indicated by the line 25—25 of Figure 24; Figure 26 is a sectional view through the engaging surfaces between the follower wedge and the outer friction shoe, the section being taken substantially in the plane indicated by the line 26—26 of Figure 25; Figures 27, 28, 29 and 30 are sectional views showing modified forms of the engaging surfaces between the follower wedge and the upper friction shoe, each of the sections being taken substantially in the same plane as shown in Figure 26; and Figures 31 and 32 are sectional views corresponding in general to the section shown in Figure 25 but showing alternate forms of engaging surfaces between the follower wedge and the friction shoe.

Figures 33 to 41 are views of a preferred form of the wedge block and inner friction shoe assembly wherein Figure 33 is a plan view thereof; Figure 34 is an elevational view partly in section, the section being taken substantially in the plane indicated by the line 34—34 of Figure 33; Figures 35 and 36 show sectional views corresponding in general to the section shown in Figure 34 and show alternate forms of engaging surfaces between the wedge block and the friction shoes; Figure 37 shows a section through the engaging surfaces of the wedge block and a friction shoe, the section being taken substantially in the plane indicated by the line 37—37 of Figure 34; and Figures 38 to 41 are sectional views taken substantially in the same plane as that of Figure 37 showing alternate forms of engaging surfaces between the wedge block and friction shoe.

Figures 42, 43, 44 and 45, heretofore referred to, are diagrammatical illustrations designed to explain the theory of my improved draft gear.

Describing the various modifications in more detail, that shown in Figures 1 to 4 comprises the housing, generally indicated at 2, of barrel-like structure reinforced along its lateral edges by the parallel flanges 4, 4, said flanges being joined adjacent the open end of the housing by the integrally formed bridge members 6, 6. The flat surfaces 8, 8 at the top and bottom of the housing (Figure 3) and the form of the flanges 4, 4 at the lateral edges make the housing of substantially rectangular outline, thus conforming in general to the inner dimensions of the standard draft gear pocket. It will be understood of course that I may omit the flanges 4, 4 thus giving the housing a design of generally tapered form or I may use a housing conforming more particularly to that described and set forth in the co-pending application bearing Serial No. 86,901 and filed in the United States Patent Office on June 24, 1936, in the name of William C. Hedgcock. Adjacent the closed end of the housing I have provided openings 10, 10 as a method of drainage and a means of lessening weight. Centrally formed in the wall 12 at the closed end of the housing is the socket 14 designed to receive and secure against rotation the head 16 of the retaining bolt 18, the opposite end of said bolt being threaded to receive the securing nut 20.

The internal surface at the friction end of the housing presents a scallop-like formation of tapering friction surfaces, the character of the taper being most clearly shown in the sectioned portions of Figures 1 and 2 as at 22 and the general form and arrangement of these friction surfaces being most clearly apparent from an inspection of Figure 3 wherein each friction shoe is seen to abut a generally V-shaped friction surface, the four shoes thus fitting into and having engagement with substantially the whole inner area of the friction end of the housing.

Within the housing is the usual spring assembly, in this embodiment comprising the large outer spring 24 positioned at the inner end of the housing by the stud-like member 26, the walls of which define the previously mentioned socket 14, and also the relatively small inner spring 28 which at its inner end abuts the stud-like member 26 and is retained in position by association with the retaining bolt 18. The outer end of the large coil spring 24 may be confined by the walls of the housing but is more properly positioned by abutment as at 30 against the inner extremity of the paired inner shoes 32, 32. The small spring 28 likewise abuts the shoes 32 nearer the axis of the gear as at 34.

The inner friction shoe 32 has the sloping face 36 against which may be seated the engaging face 38 of the wedge block 40 as most clearly shown in Figure 1. The substantially flat upper surface of the wedge block 40 provides a seat as at 42 upon which may be positioned the outer paired friction shoes 44, 44 as most clearly shown in Figure 2. The outer friction shoe 44 has the sloping face 46 against which may be seated as at 48 (Figure 2) the follower wedge 50, all of said parts being retained in position by the securing bolt 18.

A preferred modification of my invention is shown in Figures 5 to 8 inclusive wherein the housing 102 has the reinforcing flanges 104, 104 and otherwise conforms in general to the structure of the housing described for the previous embodiment as shown in Figures 1 to 4 inclusive except that the barrel is of generally oval cross section rather than generally cylindrical. In the modification now under consideration as shown in Figures 5 to 8 I have modified the housing to conform to the general oval shape shown in order more adequately and conveniently to equalize the friction per unit area of the two sets of shoes for the reasons above set forth.

The modification under consideration varies from that previously shown in that the outer end of the larger coil spring 124 abuts the spring cap 125 as at 127 instead of directly abutting the lower face of the shelf portion of the inner friction shoes 132, 132, and the spring cap abuts the shelf of the inner friction shoe as at 129. As in the modification described in Figures 1 to 4, the sloping surface 136 of the inner friction shoe provides a seat for the wedge block 140, and the substantially flat upper face of the wedge block 140 provides seats as at 142 for the outer pair of friction shoes 144, 144. The follower wedge 150 engages the outer pair of friction shoes 144, 144 along sloping surfaces as most clearly indicated at 148 (Figure 6) and the parts are retained in operative position by the usual bolt and nut assembly 118.

The overlapping character of the engaging surfaces between the outer paired friction shoes and the wedge block and between the inner paired friction shoes and the wedge block is most clearly understood by a consideration of Figure 7 for the modification shown in Figures 5 to 8 inclusive and by a consideration of Figure 3 in respect to the modification shown in Figures 1 to 4 inclusive. It will be observed that in each case the outer pair of friction shoes is seated over a substantial area of the wedge block at opposite sides thereof.

Figure 9:
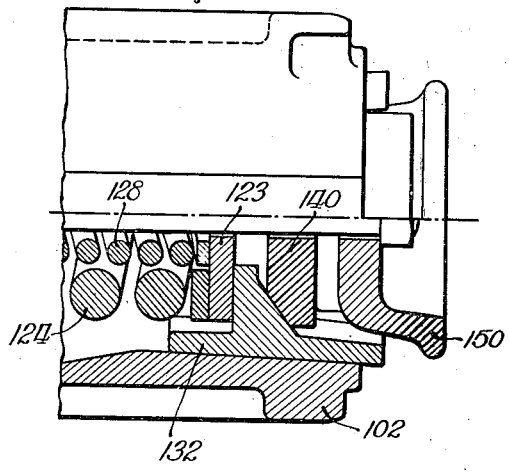
Figure 9 is a fragmentary view of a further modification embodying my invention, the structure and view corresponding in general to that shown in Figure 5 except for the manner in which the springs engage the friction parts as hereinafter more fully described.
Figure 9A:
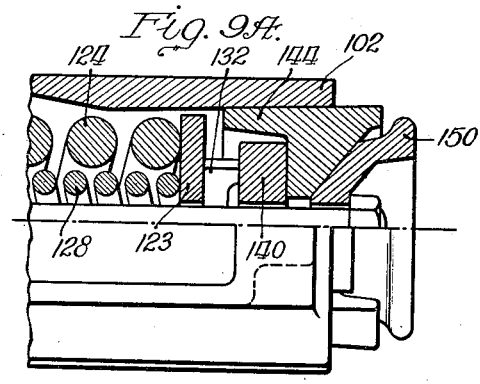
Figure 9A is a fragmentary view of the gear shown in Figure 9, the part in section being in a plane normal to the plane of the section shown in Figure 9.

Figures 9 and 9A show a further modification of my novel draft gear, Figure 9 being a fragmentary view corresponding in general to Figure 5 and Figure 9A a fragmentary view corresponding in general to Figure 6. This modification differs from that shown in Figures 5 to 8 inclusive in that both the small inner spring 128 and the larger outer spring 124 abut the spring cap 123 which in turn is seated against the inner pair of friction shoes 132. Otherwise this modification is identical with that shown in Figures 5 to 8 inclusive.

Figure 10:
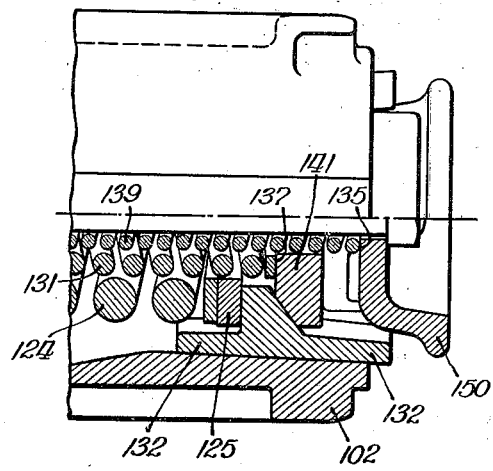
Figure 10 is a fragmentary view of a further modification of my invention, the structure and view corresponding in general to that shown in Figure 5 except for the manner in which the springs engage the friction parts as hereinafter more fully described.
Figure 10A:
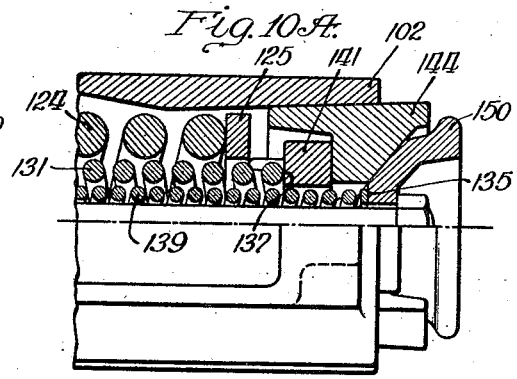
Figure 10A is a fragmentary view, partly in section, of the gear shown in Figure 10, the section being taken in a plane normal to the plane of the section shown in Figure 10.

A still further modification of my novel form of draft gear is shown in Figures 10 and 10A, Figure 10 being a fragmentary view corresponding in general to the view shown in Figure 5 and Figure 10A likewise being a fragmentary view corresponding in general to that shown in Figure 6. This modification differs from those previously shown in that in addition to the large outer spring 124, it has the intermediate spring 131 which abuts the wedge block 141 as at 137 as well as the inner spring 139 which extends through the central opening in the wedge block 141 and abuts the follower wedge 150 as at 135.

In the modification shown in Figures 10 and 10A it will be observed that each of the coil springs abuts a different member of the friction assembly, namely, the large outer coil 124 abuts the spring cap 125 which bears against the pair of inner friction shoes 132, 132, the intermediate coil spring 131 abuts the wedge block 141, and the inner coil 139 abuts the follower wedge 150. By this arrangement I have made maximum provision for release of the parts after compression inasmuch as the follower wedge when freed of the load may be urged outwardly of the housing by the inner coil 139, thus releasing the outer pair of shoes 144, 144 followed successively by the wedge block 141 under the actuation of the intermediate spring 131 and the inner pair of friction shoes 132, 132 under the impulse of the outer coil 124 operating through the spring cap 125.

The form of the follower wedge 150, shown generally in the embodiment of my invention described in Figures 5 to 8, is shown in detail in Figures 11, 12 and 13. It will be observed that the follower wedge generally indicated at 150 is of oval cup shape having around its outer periphery the flat face 68 forming a convenient abutment for the usual follower block. At the inner face and on opposite sides of the long diameter of the follower wedge are the smooth sloping surfaces 70, 70, shown flat in this embodiment, forming seats against which the follower wedge may abut the outer friction shoes. The threaded end of the securing bolt projects through the centrally formed aperture 72 and the threaded nut is conveniently received within the cavity formed on the outer face of the follower wedge as most clearly shown in the assembly drawing (Figure 6).

In Figures 14, 15 and 16 I have shown in detail the form of the outer friction shoe 144 used in that modification of my invention shown in Figures 5 to 8 inclusive. It will be observed that the friction shoe comprises a generally V-shaped wall portion 52, the outer face 54 thereof being generally complementary in form to that portion of the friction surface of the housing against which it abuts as most clearly shown at 156 (Figure 7). On the opposite face of the shoe is the shelf-like protuberance 58 having the substantially flat inner face 60 relieved along the central portion thereof as at 62 and having at its opposite edges the smooth and true surfaces 64, 64 providing seating means for the friction shoe against the wedge block which is interposed between the outer friction shoes and the inner friction shoes. The sloping upper face 66 provides a seat against which may abut the follower wedge as most clearly shown at 148 (Figure 6).

The form of the inner friction shoe 132 is shown in more detail in Figures 17, 18 and 19. It will be observed that the structure is generally similar to that of the outer pair of friction shoes except that the inner pair is designed to fit into the opposed friction faces of the housing which are on the long diameter whereas the outer friction shoes abut opposed friction surfaces of the housing along the short diameter thereof. The inner friction shoe comprises the V-shaped wall portion 74, having the outer friction face 76 conforming in general to the friction surfaces on opposite sides of the housing on the long diameter thereof as most clearly shown at 78 in Figure 7. On the opposite face of the shoe is the shelf portion 80 having on one surface the smooth face 82 against which may be seated the spring cap 125 as at 129 (Figure 5) and having the sloping surface 136 against which the wedge block 140 may abut.

In Figures 20 to 23 I have shown in more detail the structure of the wedge block 140 as used in that modification of my invention generally described in Figures 5 to 8. It will be observed that the wedge block consists of a flat piece of solid metal of substantially oval plan, thus conforming generally to the shape of the open or friction end of the housing 102. On the long diameter the V-shaped ends 84, 84 conform to the shape of the inner friction shoes which are in close proximity thereto and on the short diameter the V-shaped edges 86, 86 conform to the general shape of the outer friction shoes 140 with which they are in close proximity. The various faces around the edge of the wedge block merge into one another along smooth radii as most clearly shown at 85, 85 (Figure 20), and smooth radii are likewise provided around the perimeter of the inner and outer faces of the wedge block as shown at 87, 87. The central opening 88 provides a passage-way for the securing bolt 118 (Figure 5) or may be enlarged to accommodate a coil spring as in the modification shown in Figures 10 and 10A. At the opposite ends of the wedge block I have provided the sloping surfaces 90 and 92, respectively, which have abutment against the previously described sloping faces on the opposed inner friction shoes 132, 132. It will be observed that the surface 90 is substantially flat except for the smooth radii at the edges thereof as at 94, 94, whereas the surface 92 is arcuate as viewed in the section shown in Figure 21, while in the plane indicated by the line 23—23 and in other planes parallel thereto it has the configuration shown in Figure 23 which comprises a straight central portion a joined on either side by other straight portions b, b angling slightly from the portion a, said portions b, b merging at opposite ends through smooth radii as at 96, 96 into the arcuate portions 98, 98 at opposite ends of the section.

Referring in more detail to the assembly of the follower and outer friction shoe as shown in Figures 24 to 32, Figure 24 is a plan view and Figure 25 is an elevation, partly in section, of these parts in normal position as shown and described in the gear structure of Figures 5 to 8. Figure 26 shows a section through the engaging surfaces of the follower wedge and the outer friction shoe when both of those surfaces are flat as shown and described in the modification of Figures 5 to 8; Figures 27 and 28 are sections through similar planes, showing alternate forms wherein the engaging faces are V-shaped instead of flat. In Figure 27 the surface of the follower wedge 150A is shown as channel shape while in Figure 28 the surface of the friction shoe 144B is channel shape and in each case the opposed surface is complementary in form. In Figures 29 and 30 the engaging faces of the follower wedge and friction shoe are arcuate in form; in Figure 29 the face of the follower wedge 150C is concave whereas in Figure 30 the face of the follower wedge 150D is convex and in each case the engaging surface of the friction shoe is complementary in form as shown. In Figures 31 and 32 alternate forms of the section shown in Figure 25 are presented in one of which, Figure 31, the face of the follower wedge 150E is arcuate in form, abutting against a flat face on the friction shoe 144E, whereas Figure 32 presents the converse with the arcuate face on the friction shoe 144F and the flat face on the follower wedge 150F.

Describing in more detail the wedge block and inner friction shoe assembly as shown in Figures 33 to 41 inclusive, Figure 33 shows a plan view of the parts in normal position and substantially as shown in Figures 5 to 8 inclusive, and Figure 34 is an elevation thereof, partly in section, the section being taken substantially in the plane indicated by the line 34—34 of Figure 33. In the section shown in Figure 34 the engaging faces between the wedge block and the inner friction shoe are substantially flat as also shown in Figure 5 whereas in the alternate form, shown in Figure 35, the friction shoe engaging face of the wedge block 140A is arcuate and abuts the flat face on the friction shoe 132A. In Figure 36 the form of the engaging faces is reversed with the arcuate face on the friction shoe 132B and the flat face on the wedge block 140B. Figure 37 shows a section through these engaging faces in the plane indicated by the line 37—37 of Figure 34 wherein the opposed faces are flat surfaces. Figures 38 and 39 show alternate forms for these engaging faces. In Figure 38 the face on the wedge block 140C is a V-shaped channel while in the alternate form shown in Figure 39 the face of the friction shoe 132D is a V-shaped channel, and in both cases the abutting surface is of complementary shape. In the alternate forms of these faces shown in Figures 40 and 41 the faces are arcuate; in one case, Figure 40, the face of the wedge block 140E is shown concave with the complementary convex friction face of the friction shoe 132E while in Figure 41 the form of these faces is reversed with the face of the wedge block 140F convex and the face of the friction shoe 132F concave.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a multiple action draft gear of the clutch type comprising a plurality of sets of shoes in series, a housing comprising pairs of opposed V-shaped tapering internal friction faces adjacent the open end thereof and substantially therearound, pairs of diametrically opposed friction shoes seated respectively against said friction faces with the shoes of respective pairs arranged in overlapping relationship longitudinally of said housing, said pairs being arranged along axes substantially at right angles to each other, a compression spring, a follower wedge, one pair of said shoes having abutment against said compression spring, another pair of said friction shoes having abutment against said follower wedge, and a wedge block interposed between the respective pairs of friction shoes, the abutting faces between said follower wedge and the outer pair of said friction shoes being in planes diagonal with respect to the axis of said gear and the abutting faces between said outer pair of friction shoes and said wedge block being in a plane substantially normal to the axis of said gear.

2. A multiple action draft gear of the clutch type comprising a plurality of sets of shoes in series, a housing having tapering friction faces adjacent the open end thereof, said faces being arranged along axes substantially at right angles to each other, a compression spring, a follower wedge, a pair of diametrically opposed outer friction shoes in abutment against certain of said faces, a pair of diametrically opposed inner friction shoes having abutment against other of said friction faces, the shoes of respective sets being arranged in overlapping relationship longitudinally of said housing, and a wedge block, said wedge block having abutment with one pair of said friction shoes in a plane substantially normal to the axis of said gear and having abutment on its opposite face with the other pair of said friction shoes along planes diagonal with respect to the axis of said gear, certain of said friction shoes having engagement with said follower wedge.

3. In a multiple action draft gear of the clutch type comprising a plurality of sets of shoes in series, a housing having pairs of opposed V-shaped tapering internal friction faces arranged along axes substantially at right angles to each other, inner and outer pairs of diametrically opposed friction shoes seated respectively against said faces and in overlapping relationship longitudinally of said housing, a compression spring, a follower wedge, and a wedge block interposed between respective pairs of friction shoes and having engagement with said outer pair of friction shoes along opposite edges of one face of said wedge block in a plane substantially normal to the axis of said gear, and having engagement with said inner pair of friction shoes along other opposite edges of the other face of said wedge block on surfaces angularly disposed with respect to the axis of said gear, the angularly disposed surfaces on said friction shoes being of arcuate form and the engaging faces of said wedge block being flat.

4. In a multiple action draft gear comprising two sets of shoes in series, a housing comprising pairs of V-shaped tapering internal friction faces arranged along axes at right angles to each other and substantially around said housing, inner and outer pairs of diametrically opposed friction shoes seated respectively against said faces with the shoes of respective sets in overlapping relationship longitudinally of said housing, a compression spring, a follower wedge, and a wedge block interposed between the respective pairs of said shoes, said inner pair of shoes having abutment against said compression spring, said outer pair of shoes having engagement with said follower wedge along surfaces diagonally arranged with respect to the axis of said gear, one set of said diagonally arranged surfaces having flat engaging faces and another set having complementary arcuate surfaces convex on the wedge and concave on the shoe.

5. In a multiple action draft gear having two sets of shoes in series, a housing, a spring, wedging means comprising a follower and a block, and sets of diametrically opposed friction shoes seated against said housing along axes at right angles to each other, the shoes of respective sets having overlapping relationship longitudinally of said housing, one set being interposed between said block and said follower and another set between said block and said spring, the engaging faces between one set of said shoes and said housing being of substantially greater area than the engaging faces between the other set of said shoes and said housing, and the angle of engagement between said follower and the adjacent set of shoes being less acute with respect to the axis of said gear than the angle of engagement between the other set of said shoes and said block.

6. In a draft gear comprising a plurality of sets of shoes in series, a housing comprising pairs of V-shaped tapering internal friction faces adjacent the open end thereof, said faces being arranged along axes at right angles to each other and substantially around said housing, pairs of diametrically opposite friction shoes seated respectively in said friction faces with shoes of respective sets arranged in overlapping relationship longitudinally of said housing, a compression spring, a follower wedge, one pair of said shoes having abutment against said compression spring, another pair of said friction shoes having abutment against said follower wedge, and a wedge block interposed between the respective pairs of friction shoes, certain of the abutting faces between said friction shoes and said wedge block lying in a plane substantially normal to the axis of said gear and certain other of said faces lying in planes other than normal to the axis of said gear.

7. In a draft gear of multiple action type with two sets of shoes in series, a housing comprising pairs of V-shaped tapering internal friction faces arranged along axes at right angles to each other and substantially around said housing, inner and outer pairs of diametrically opposite friction shoes seated respectively against said faces with the shoes of respective pairs in overlapping relationship longitudinally of said housing, a compression spring, a follower wedge, and a wedge block interposed between respective pairs of said shoes, said inner pair of shoes having abutment against said compression spring, and said outer pair of shoes having engagement with said follower wedge along surfaces diagonally arranged with respect to the axis of said gear, one set of said diagonally arranged surfaces having flat engaging faces and the other set having complementary V-shaped faces.

8. In a draft gear of multiple action type including a plurality of sets of shoes in series, a housing comprising pairs of V-shaped tapering internal friction faces arranged substantially around said housing along axes at right angles to each other, inner and outer pairs of diametrically opposite friction shoes seated respectively against said faces with the shoes of respective sets in overlapping relationship longitudinally of said housing, a compression spring, a follower wedge, and a wedge block interposed between the respective pairs of said shoes, said inner pair of shoes having abutment against said compression spring, and said outer pair of shoes having engagement with said follower wedge along surfaces diagonally arranged with respect to the axis of said gear, said diagonally arranged surfaces on said shoes being arcuate in form and on said follower wedge flat.

9. In a multiple action draft gear including two sets of shoes in series, a housing comprising pairs of V-shaped tapering internal friction faces arranged therearound along axes at right angles to each other, inner and outer pairs of diametrically opposite friction shoes seated respectively against said faces with the shoes of respective sets in overlapping relationship longitudinally of said gear, a compression spring, a follower wedge, and a wedge block interposed between respective pairs of said shoes, said inner pair of shoes having abutment against said compression spring, and said outer pair of shoes having engagement with said follower wedge along surfaces diagonally arranged with respect to the axis of said gear, said diagonally arranged surfaces on said shoes being flat and on said follower wedge being of arcuate form.

10. In a multiple action draft gear of the clutch type comprising sets of shoes in series, a housing comprising pairs of tapering internal friction faces around the open end thereof with the faces of respective pairs in alternate relationship and arranged along axes at right angles to each other, pairs of diametrically opposite friction shoes seated respectively against said faces with the shoes of respective pairs in overlapping relationship longitudinally of said gear, a compression spring, a follower wedge, one pair of said shoes having abutment against said compression spring, another pair of said friction shoes having abutment against said follower wedge, and a wedge block interposed between the respective pairs of friction shoes, certain of the abutting faces between said friction shoes and said wedge block lying in a plane substantially normal to the axis of said gear.

11. In a multiple action draft gear having sets of shoes in series, a housing, a spring, wedging means comprising a follower and a block and sets of diametrically opposite friction shoes seated against said housing along axes at right angles to each other with the shoes of respective sets in alternate arrangement and overlapping longitudinally of said gear, one set being interposed between said block and said follower and another set between said block and said spring, the engaging faces between said housing and the set of shoes between said block and follower being of substantially greater area than the engaging faces between the other set of shoes and said housing, whereby the pressure per unit area of all of said shoes is substantially equalized in view of said series arrangement.

12. In a draft gear having sets of shoes in series, a housing comprising sets of tapering internal friction faces arranged substantially around the open end of said housing with the faces of respective sets arranged along axes at right angles to each other, inner and outer sets of diametrically opposed friction shoes seated respecively against said faces and in overlapping relationship longitudinally of said gear, a compression spring, a follower wedge, and a wedge block interposed between the respective pairs of said shoes, said inner pair of shoes having abutment against said compression spring and said outer pair of shoes having engagement with said follower wedge along surfaces diagonally arranged with respect to the axis of said gear.

13. In a draft gear having sets of shoes in series, a housing, a spring, wedging means comprising a block and a follower, and pairs of diametrically opposite friction shoes seated against said housing along axes at right angles to each other and interposed respectively between said follower and said block and between said block and said spring, the shoes of respecive pairs being arranged in overlapping relationship longitudinally of said housing and substantially therearound, the angle of engagement between said follower and the adjacent pairs of shoes being less acute with respect to the axis of said gear than the angle of engagement between said block and the other pair of said shoes, whereby the pressure per unit area of said shoes against said housing may be substantially equalized in view of said series arrangement.

14. In a multiple action draft gear of clutch type having pairs of diametrically opposite shoes in series, a housing, a spring, wedging means comprising a wedge follower and a wedge block and two pairs of friction shoes seated against said housing along axes at substantially right angles to each other, one set of said shoes being interposed between said wedging means and the other of said sets being interposed between said spring and said wedge block.

15. In a multiple action draft gear having two pairs of shoes in series, a housing, a spring, wedging means comprising a wedge follower and a wedge block and two pairs of diametrically opposite friction shoes seated against said housing along axes substantially at right angles to each other and arranged in overlapping relationship longitudinally of said gear, said pairs being arranged in series between said spring and said wedge follower with said wedge block interposed between said pairs.

16. In a draft gear comprising a clutch mechanism with sets of shoes in series, a housing, resilient means, a wedge block, a follower wedge, and a plurality of sets of diametrically opposed friction shoes seated against said housing along axes at right angles to each other with the shoes of respective sets in overlapping relationship longitudinally of said gear, one set being interposed between said follower and said wedge block and the other set being interposed between said resilient means and said wedge block.

17. In a draft gear comprising a clutch mechanism with two pairs of shoes in series, a housing, resilient means, wedging means comprising a wedge block and a wedge follower and two pairs of diametrically opposite friction shoes seated against said housing along axes substantially at right angles to each other with the shoes of respective sets in overlapping relationship longitudinally of said gear, said friction shoes and wedge means being so arranged that the force passes successively from the resilient means through one pair of shoes, thence through said wedge block and the other pair of shoes to the wedge follower, whereby multiple action is developed substantially as described.

18. In a draft gear of clutch type having a plurality of sets of shoes in series, a housing, a spring, wedging means comprising a wedge block and wedge follower and two pairs of diametrically opposite friction shoes arranged to engage alternate friction faces of said housing along axes substantially at right angles to each other with the shoes of respective pairs in overlapping relationship longitudinally of said gear to abut substantially the entire inner area of said housing at the friction end thereof, one pair of said shoes being interposed between said follower and said block and the other pair interposed between said spring and said block, whereby the pressure developed passes through the two sets of shoes in series in multiple action substantially as described.

19. In a draft gear of multiple action type having two pairs of shoes in series, a housing having a friction end, a spring, wedging means comprising a block and a follower and two pairs of diametrically opposite friction shoes alternately disposed against said housing along axes substantially at right angles to each other with shoes of respective sets in overlapping relationship longitudinally of said gear and abutting substantially the entire inner area of said friction end, one set of said shoes being interposed between said block and said follower and another set between said spring and said block, whereby the pressure developed when said gear is placed under load passes through said sets of shoes in multiple action substantially as described.

20. In a draft gear, a housing having an oval end with internal tapering friction faces arranged in two sets aligned with the long and short axes of said oval end, compression springs, a follower and two sets of friction shoes arranged in series between said follower and springs in abutment with said sets of surfaces respectively, and a wedge block interposed between said sets of shoes.

21. In a draft gear, a housing having an oval end with internal tapering friction faces arranged in two sets aligned with the long and short axes of said oval end, compression springs, a follower, and two sets of friction shoes arranged in series between said follower and springs in abutment with said sets of surfaces respectively, and a wedge block interposed between said sets of shoes, said wedge block having abutment with certain of said springs.

22. In a draft gear, a housing having an oval end with internal tapering friction faces arranged in two sets aligned with the long and short axes of said oval end, compression springs, a follower, two sets of friction shoes arranged in series between said follower and springs in abutment with said sets of faces respectively, and a wedge block interposed between said sets of shoes, said wedge block having diagonal face engagement with one set of said shoes.

23. In a draft gear, a housing having an oval end with sets of diametrically opposed internal friction surfaces aligned respectively along the long and short diameters thereof, a compression spring, a follower, sets of shoes arranged in series between said follower and spring and seated against said sets of surfaces respectively, and a wedge block interposed between said shoes.

24. In a clutch draft gear of multiple action series type, a housing having an oval open end with sets of opposed internal tapering friction faces arranged along axes approximately at right angles to each other and aligned with the long and short diameters of said oval end, a compression spring, and wedging means comprising a follower, a block, and two sets of friction shoes seated respectively against said sets of faces and interposed respectively between said follower and block, and said block and spring, the engaging surfaces between said follower and one set of said shoes being of complementary arcuate form.

25. In a clutch draft gear of multiple action series type, a housing having an oval open end with two pairs of opposite internal tapering friction faces arranged along axes approximately at right angles to each other and in alignment with the long and short diameters of said oval end, a compression spring, and wedging means comprising a follower, a block, and two sets of friction shoes seated respectively against said pairs of faces and interposed respectively between said follower and block, and said block and spring, the engaging surfaces between said follower and one set of said shoes being of complementary V-shaped form.

26. In a clutch draft gear of multiple action series type, a housing having an oval open end with two pairs of opposite internal tapering friction faces arranged along axes approximately at right angles to each other and aligned with the long and short diameters of said oval end, a compression spring, and wedging means comprising a follower, a block, and two sets of friction shoes seated respectively against said sets of faces and interposed respectively between said follower and block, and said block and spring, the engaging surfaces between said block and one set of shoes being flat and between said block and the other set of said shoes being of complementary arcuate form.

27. In a draft gear, a housing having diametrically opposed V-shaped friction faces adjacent the open end thereof, sets of friction shoes arranged along axes substantially at right angles to each other and seated against said opposed faces respectively, a wedge follower abutting one set of said shoes outwardly thereof, resilient means abutting the other set of said shoes inwardly thereof, and a wedge block interposed between said sets of shoes, the shoes of said respective sets being positioned in overlapping relationship longitudinally of said housing.

ROBERT B. COTTRELL.